Figure 1:
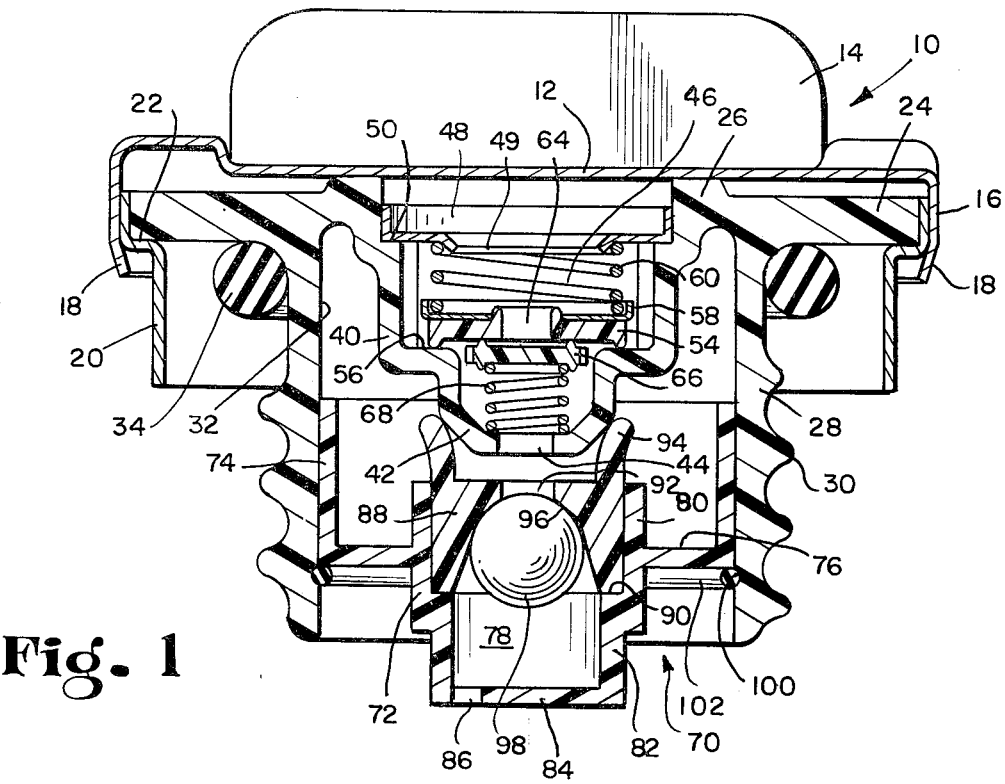

United States Patent [19]

Evans

[11] 3,985,260
[45] Oct. 12, 1976

[54] GAS CAP WITH CLAMP-IN ROLL-OVER VALVE

[75] Inventor: John H. Evans, Connersville, Ind.

[73] Assignee: Stant Manufacturing Company, Inc., Connersville, Ind.

[22] Filed: Sept. 26, 1975

[21] Appl. No.: 617,005

[52] U.S. Cl. .............................. 220/203; 137/43; 220/303
[51] Int. Cl.² ........................................ B65D 51/16
[58] Field of Search ............... 220/203, 202, 303; 137/43, 519.5, 533.11

[56] References Cited
UNITED STATES PATENTS

| | | | |
|---|---|---|---|
| 1,380,415 | 6/1921 | Putnam | 137/533.11 |
| 2,185,097 | 12/1939 | Woodbridge | 137/43 |
| 2,185,098 | 12/1939 | Woodbridge | 137/43 |
| 3,610,263 | 10/1971 | Walters | 137/43 |
| 3,757,987 | 9/1973 | Marshall | 220/203 |
| 3,820,680 | 6/1974 | Friend | 220/203 |

*Primary Examiner*—Stephen P. Garbe
*Assistant Examiner*—Allan N. Shoap
*Attorney, Agent, or Firm*—Jenkins, Hanley & Coffey

[57] ABSTRACT

A pressure-vacuum valved cap for a vehicle fuel tank having an upwardly extending filler neck formed with a peripherally extending, upwardly facing sealing lip or sealing surface concentric with the longitudinal axis of the neck, the cap comprising a cover, a valve body providing a centrally disposed passageway extending axially therethrough concentric with and in communication with the filler neck, the valve body being connected to the cover to extend downwardly into the filler neck, a seal provided between the valve body and the lip of the filler neck, and a pressure-vacuum valve assembly disposed in the passageway to normalize the pressure in the fuel tank. The improvement comprises a rubber-like insert having a concentric opening extending axially therethrough, an upper portion and a lower portion. The insert is held against the valve body so that the insert upper portion engages and seals against the valve body about the vent opening which is in communication with the passageway. The insert lower portion provides a concentric, axially downwardly facing valve seat, and the cap includes a ball held for movement into closing engagement with the valve seat to close the passageway when the filler neck is tilted downwardly to a predetermined angle.

5 Claims, 2 Drawing Figures

U.S. Patent   Oct. 12, 1976   3,985,260

GAS CAP WITH CLAMP-IN ROLL-OVER VALVE

The present invention relates to vehicle fuel tank caps, and more particularly to the provision of such a cap having pressure-vacuum valve means therein for venting the tank to atmosphere when the pressure in the tank exceeds a predetermined superatmospheric level and when the pressure in the tank drops below a predetermined subatmospheric level and, in addition, roll-over valve means effective to prevent the flow of gas through the pressure-vacuum valve means if the vehicle is rolled over in an accident.

The prior art contains several examples of inventors' efforts to solve the problem of providing pressure-vacuum valves and even roll-over valves in caps of fuel tanks. For instance, U.S. Pat. No. 3,757,987 issued Sept. 11, 1973 in U.S. Class 220/44R, 137/43 discloses a cap with a combination pressure-vacuum valve and roll-over valve on the filler neck of a fuel tank. The Dawson et al. U.S. Pat. No. 3,820,680 issued June 28, 1974 in U.S. Class 220/39R, 220/44R, 220/46R discloses a gas cap with the pressure-vacuum valve means therein. Such a pressure-vacuum valve means is also disclosed in the Robert Rodgers U.S. Pat. No. 3,831,801.

While the prior art has examples of pressure-vacuum valves and roll-over valves, the combination valve arrangement of the present invention constitutes a significant improvement over the prior art because of the ease with which it is manufactured. Basically, the improvement of the present invention comprises a clamp-in, roll-over valve assembly which is secured into the valve body housing means of a gas cap to provide an effective seal with the valve body and to provide, in addition, an axially downwardly facing, concentric valve seat and a ball disposed for movement against the valve seat when the filler neck is tilted.

Other objects and features of the present invention will become apparent as this description progresses.

Figure 2:
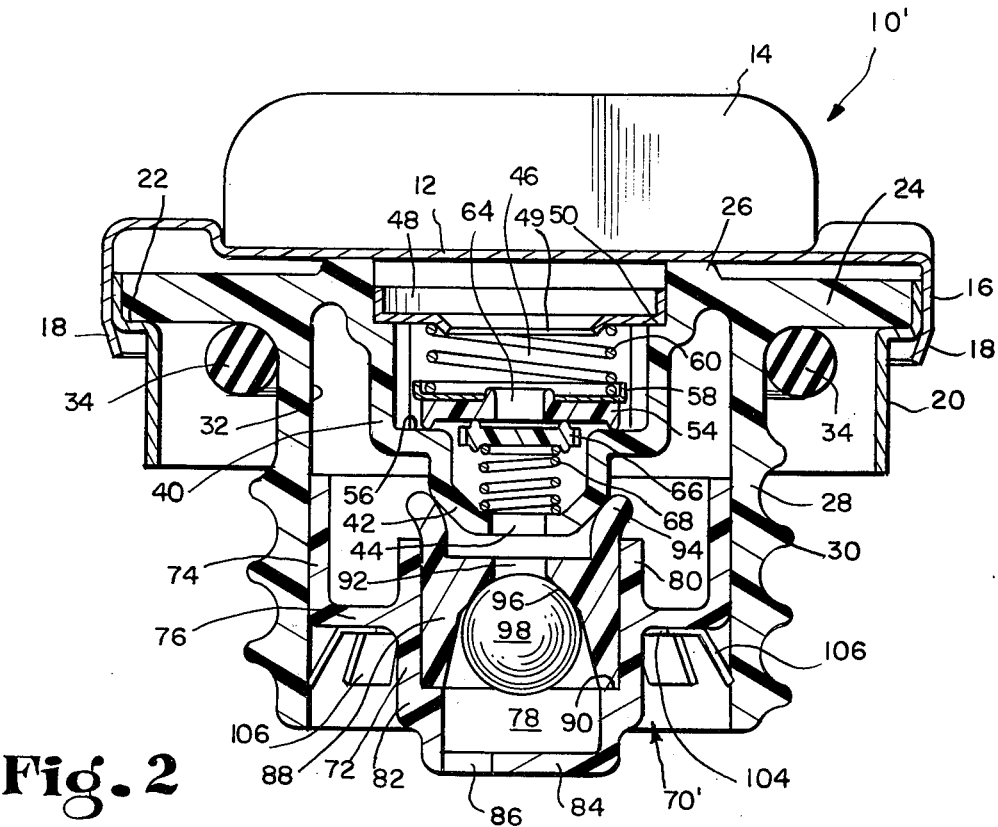

In the drawings:

FIG. 1 is a sectional view of a cap constructed in accordance with the present invention; and FIG. 2 is a sectional view of another embodiment of the present invention.

Referring now to the drawings, it will be seen that the cap 10 comprises a cover 12 having an upturned flange 14 serving as a handle and having also a peripherally extending, depending skirt 16 turned radially inwardly as indicated at 18 to capture a retaining ring 20 formed to provide a peripherally and radially extending ledge 22 for supporting a peripherally and radially outwardly extending flange 24 of a molded plastic housing means 26. Illustratively, the housing means 26 is molded to form an axially downwardly extending concentric sleeve 28 having external threads 30 for engaging the internal threads of the filler neck and having also an internal diameter wall surface indicated at 32. The flange 24 is provided at the axially upper end portion of the cap to overlie the conventional peripherally extending lip of the filler neck, and an O-ring seal 34 is disposed about the sleeve 28 adjacent the flange 24 sealingly to engage that lip.

The illustrative housing means 26 is also molded to form, integrally with the flange 24 and sleeve 28, an axially downwardly extending and concentric valve body 40 which terminates with an axially downwardly projecting lower portion 42 having a central vent opening 44 providing communication with the valve passageway 46 extending axially through the valve body. A plate 48 is pressed into the housing means 26 to rest on the peripherally and radially extending, upwardly facing flange 50 to close the upper end of the valve passageway 46, the plate 48 having a central vent opening 49 formed therein and having a slightly downturned edge to serve as a spring retainer.

The pressure-vacuum valve assembly is conventional in that it includes a pressure valve member 54 urged into sealing engagement with a peripherally and radially extending, upwardly facing valve seat 56 provided by the valve body 40. The pressure valve spring means includes a spring plate or valve plate 58 and a coiled compression spring 60 captured between the valve member 54 and plate 48. The valve member 54 is provided with a concentric vent opening 64 which is normally closed by a vacuum valve member 66 urged upwardly by a coiled spring 68.

The valve body 40, therefore, provides a first valve passageway 46 normally closed by a pressure-vacuum valve assembly. When the fuel tank upon which the cap 10 is mounted rolls over to flow gasoline down through the filler neck, the gasoline will have sufficient head pressure to push the valve member 54 open so that there will be leakage of gasoline through the vented cap 10, it being understood that the cover 12 is conventionally provided with inverted troughs for venting the valve passageway 46 to atmosphere.

In order to prevent such leakage of gasoline in a roll-over situation, a roll-over valve means 70 is clamped into the housing means 26, this roll-over valve means 70 essentially providing a second valve passageway in communication with the first valve passageway 46 and a ball-check valve for closing the second passageway. The illustrative valve means 70 includes a generally cylindrically formed, molded plastic carrier member 72 having a cylindrical outer wall 74 telescopically received within the internal wall 32 of the sleeve 28. An annular floor 76 extends radially inwardly from the outer wall 74 to a concentric, axially extending shell defining the said second passageway 78, the illustrative shell including an upwardly extending shell wall portion 80 and a downwardly extending shell wall portion 82. A floor 84 having a plurality of venting aperatures 86 formed therein (only one of which is shown) is provided closing the passageway 78. Then, a relatively soft, rubber-like insert 88 is disposed in the second passageway 78 illustratively to rest upon a peripherally and radially extending, upwardly facing ledge 90. This insert 88 has a concentric, axially extending opening 92 providing communication between the valve passageway 46 and the passageway 78. The upper portion 94 of the insert 88 is illustratively a slightly outwardly flaring sleeve which snugly receives and seals against the downwardly extending portion 42 of the valve body 40. This upper portion 94, therefore, provides a seal between the roll-over valve means 70 and the pressure-vacuum valve assembly in the passageway 46.

The lower portion of the insert 80 is formed to provide an axially downwardly facing, concentric valve seat 96 bounding the opening 92, the illustrative seat being generally conical. A ball 98 is captured below the insert 88 in the passageway 78 to roll against this valve seat 96 when the filler neck is tilted over. It will be appreciated that this ball 98 is simply dropped into the passageway 78 before the insert 88 is assembled within the carrier member 72.

Means are provided for clamping the roll-over valve means 70 in cooperative association with the valve body 40 and particularly for clamping the carrier member 72 in the housing means 26. In FIG. 1, the carrier member 72 is secured within the sleeve 28 by means of an internal groove 100 formed in the wall 32 of the sleeve and a snap ring 102 engaging that groove. In the embodiment of FIG. 2, the roll-over valve means 70' is secured by means of an annular clip 104 which, illustratively, is a metal spring-like clip having a plurality of peripherally spaced apart, downwardly and radially outwardly extending spring-like fingers having distal ends which engage and bite into the surface of the wall 32 to hold the carrier member 72 within the sleeve 28. It will be appreciated that this clip 104 is merely pressed upwardly against the floor 76 during the assembly operation to a position at which the upper portion 94 of the insert 88 is in tight sealing engagement with the valve body portion 42.

It will be appreciated that the ball 98 is illustrated in its closing position against the seat 96 even though the cap is illustrated in its upright position where the ball normally would be resting on floor 84.

I claim:

1. A pressure-vacuum valved cap for a fuel tank having an upwardly extending filler neck formed with a peripherally extending lip concentric with the longitudinal axis of said neck, said cap comprising a cover, a valve body providing a centrally disposed passageway extending axially therethrough concentric with and in communication with said filler neck, means for connecting said valve body to said cover so that said valve body extends axially downwardly into said filler neck, means for providing a seal between said valve body and said lip, said valve body and said passageway having an axially upper end portion and an axially lower end portion, pressure-vacuum valve means disposed in said passageway for normalizing the pressure in the tank, venting the tank to atmosphere when the pressure in the tank exceeds a predetermined superatmospheric level and when the pressure in the tank drops below a predetermined subatmospheric level, said lower end portion providing a concentric vent opening communicating with said passageway, in which the improvement comprises a rubber-like insert having a concentric opening extending axially therethrough, an upper portion and a lower portion, means for holding said insert against said valve body so that said insert upper portion engages and seals against said valve body about said vent opening, said insert lower portion providing a concentric, axially downwardly facing valve seat, and a ball contained in said cap for movement into closing engagement with said valve seat to close said passageway when the filler neck is tilted downwardly to a predetermined angle, said cap having an axially downwardly projecting sleeve concentric with and spaced radially outwardly from said valve body, said holding means including a carrier member extending upwardly into said sleeve and means for clamping said carrier member in position in said sleeve, said carrier member holding said insert in position relative to said valve body.

2. The improvement of claim 1 in which said sleeve and valve body are integrally molded together of plastic material, said carrier member being molded from plastic to have a generally cylindrical outer wall telescopically received in said sleeve, said carrier member also having a depending cup portion capturing said ball for movement toward and away from said valve seat.

3. The improvement of claim 2 in which said sleeve is formed to provide a peripherally extending groove in its internal diameter, said clamping means being a snap ring engaging said groove.

4. The improvement of claim 3 in which said clamping means includes an annular clip having a plurality of peripherally spaced apart, radially outwardly and downwardly extending resilient fingers engaging said sleeve, said clip supporting said carrier member.

5. A pressure-vacuum valved cap for a fuel tank filler neck formed with a peripherally extending, upwardly facing sealing surface concentric with the longitudinal axis of said neck, said cap comprising a cover, means providing a concentric housing extending downwardly into said filler neck and connected to said cover, means providing a seal between said housing means and said sealing surface, said housing means including a valve body providing a centrally disposed concentric first passageway extending axially therethrough and in communication with said tank, said valve body terminating with an axially downwardly projecting portion having a central opening therein in communication with said first passageway, pressure-vacuum valve means disposed in said passageway for normalizing the pressure in the tank, venting the tank to atmosphere when the pressure in the tank exceeds a predetermined superatmospheric level and when the pressure in the tank drops below a predetermined subatmospheric level, said housing means also including an axially projecting sleeve concentric with and spaced radially outwardly from said valve body, in which the improvement comprises roll-over valve means for closing said passageway when the filler neck is tilted downwardly to a predetermined angle relative to a horizontal plane, said roll-over valve means including a carrier member inserted upwardly into said sleeve, said carrier member having means defining a second concentric passageway extending axially therethrough and in communication with said first passageway and the tank, a rubber-like insert disposed in said second passageway, said insert having a central opening extending axially therethrough, a lower portion providing a concentric, axially downwardly facing valve seat, and an upper portion sealingly engaged against said downwardly projecting portion of said valve body, a ball disposed in said second passageway to move into closing engagement with said valve seat to close said second passageway, and means for clamping said carrier member in said sleeve to hold said upper portion against said valve body downwardly projecting portion.

\* \* \* \* \*

PO-1050
(5/69)

UNITED STATES PATENT OFFICE
CERTIFICATE OF CORRECTION

Patent No. 3,985,260   Dated October 12, 1976

Inventor(s) John H. Evans

It is certified that error appears in the above-identified patent and that said Letters Patent are hereby corrected as shown below:

Column 4, line 14 (Claim 4, line 1), "The improvement of claim 3" should be -- The improvement of claim 2 --.
Column 4, line 38 (Claim 5, line 20) after "axially" insert -- downwardly --.

Signed and Sealed this

Twenty-fifth Day of January 1977

[SEAL]

Attest:

RUTH C. MASON
*Attesting Officer*

C. MARSHALL DANN
*Commissioner of Patents and Trademarks*